Aug. 13, 1940.   E. G. BAILEY ET AL   2,211,725
CONTROL SYSTEM
Original Filed Dec. 18, 1935   4 Sheets-Sheet 4
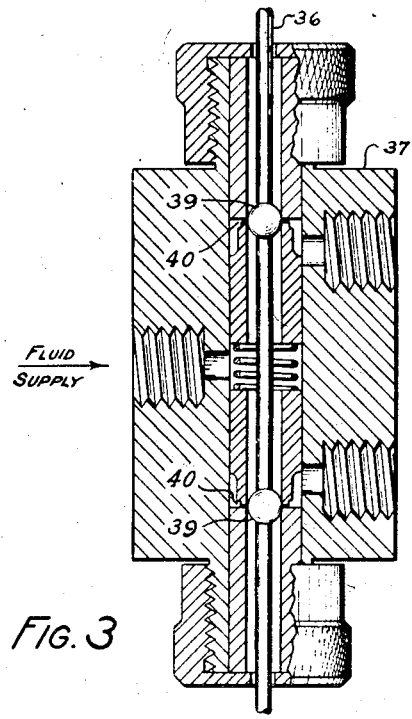
Fig. 3
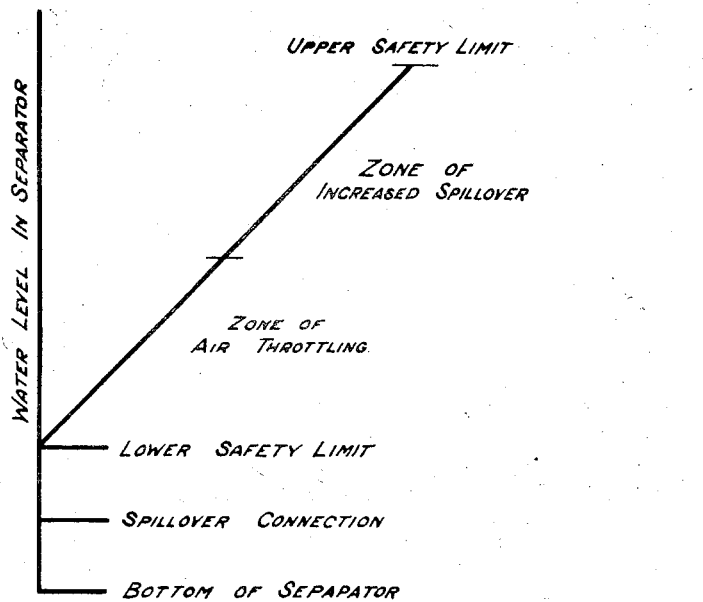
Fig. 8
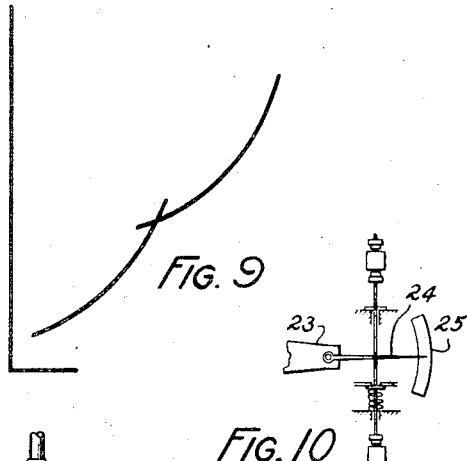
Fig. 9
Fig. 10
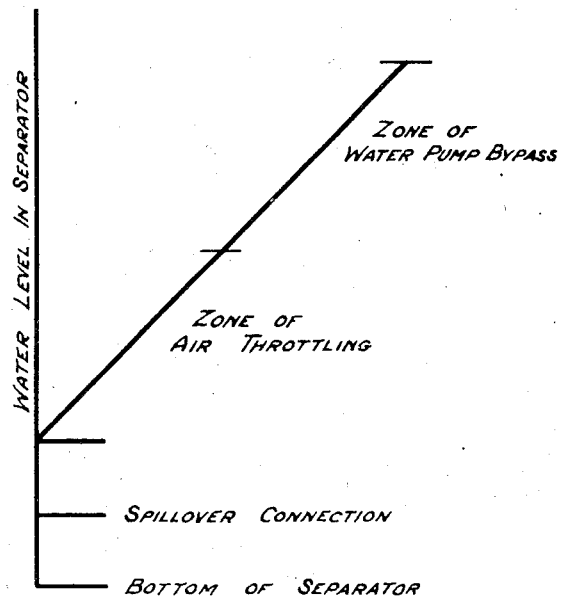
Fig. 7
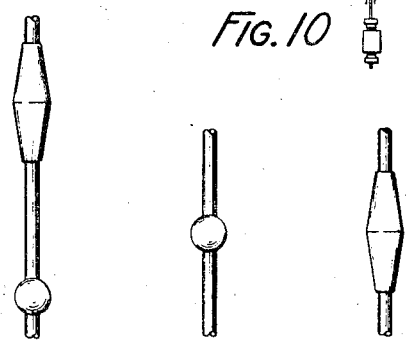
Fig. 6   Fig. 4   Fig. 5
INVENTORS
ERVIN G. BAILEY
PAUL S. DICKEY
BY
Raymond W. Junkins
ATTORNEY Patented Aug. 13, 1940

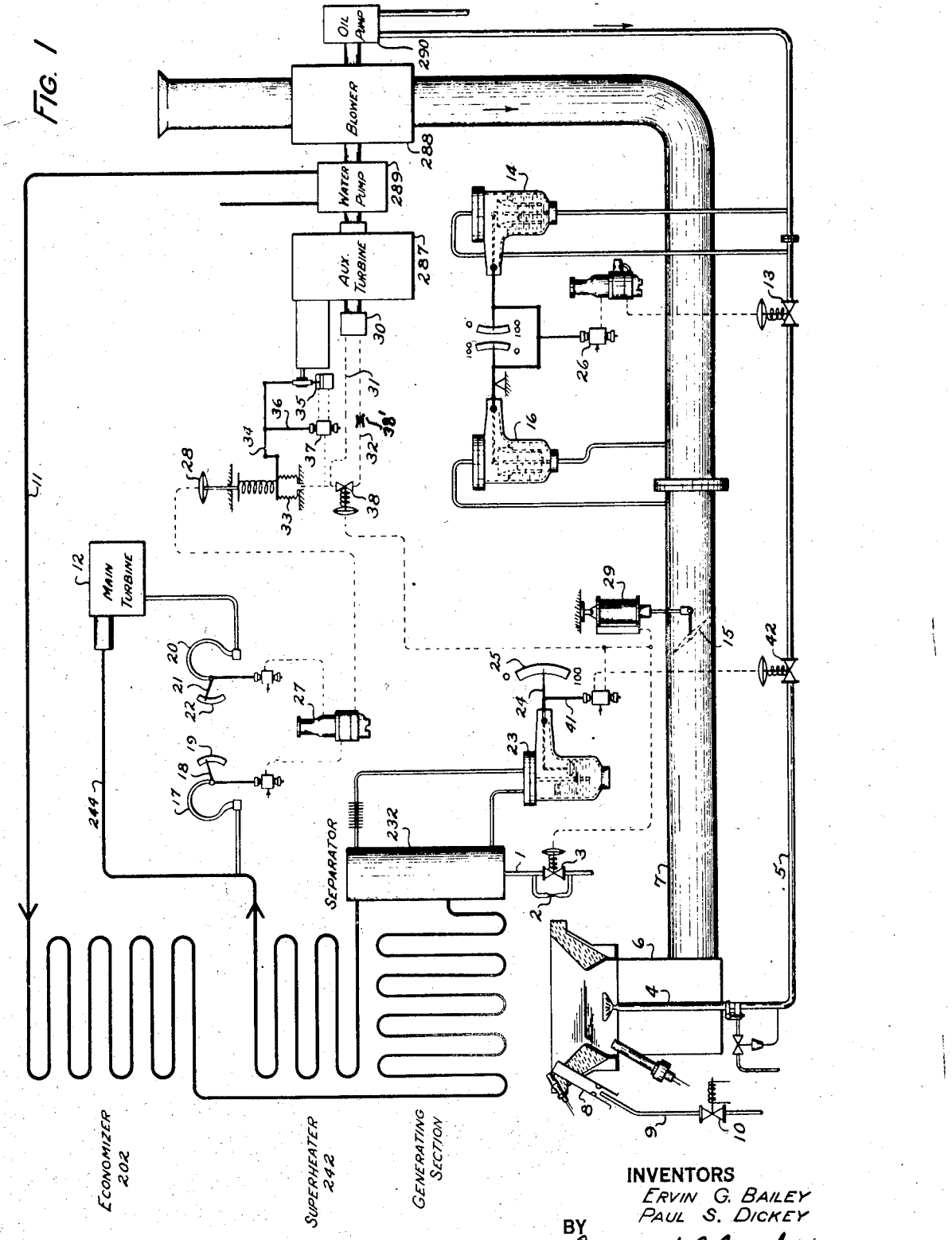

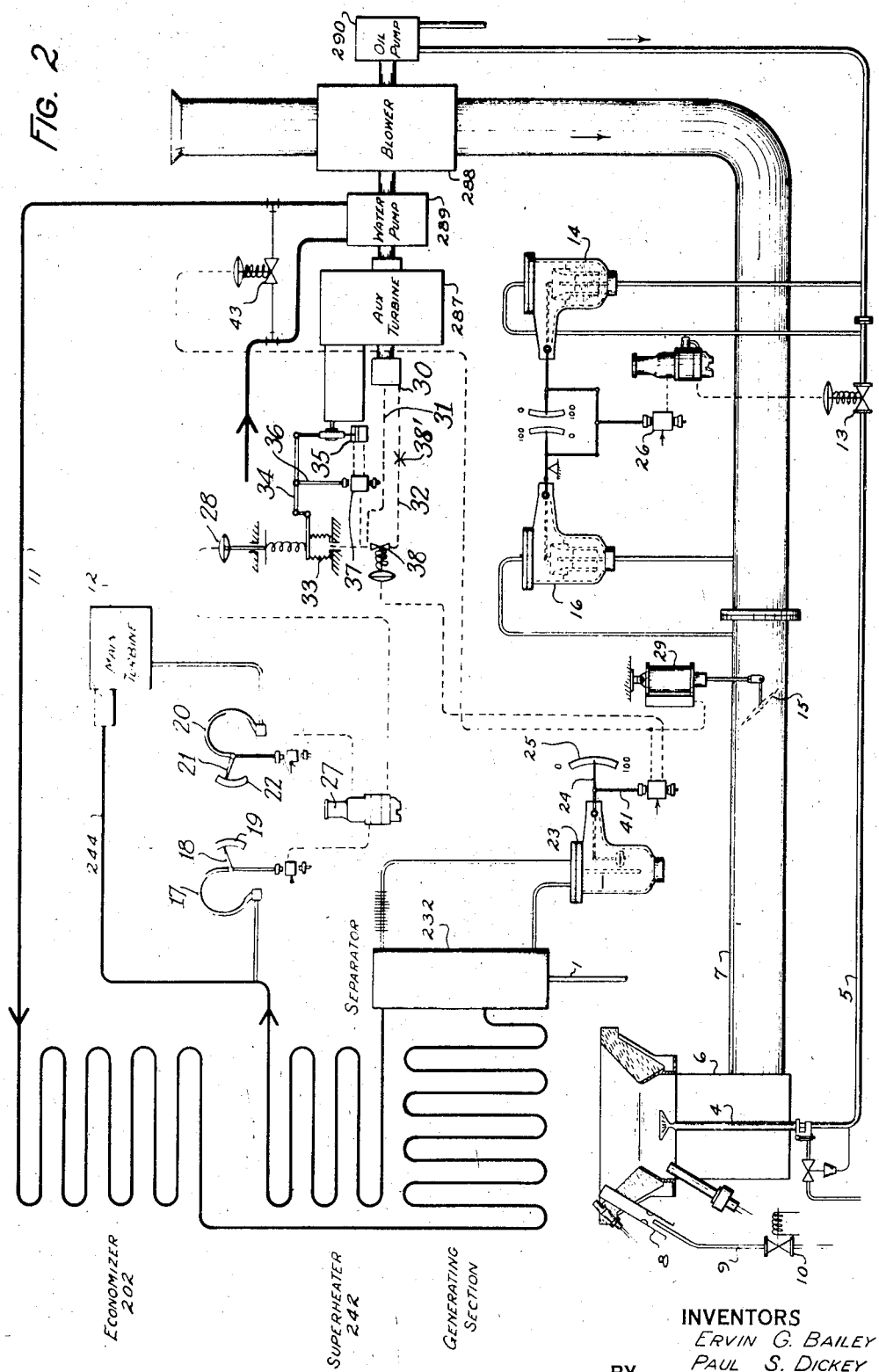

2,211,725

UNITED STATES PATENT OFFICE 2,211,725

CONTROL SYSTEM

Ervin G. Bailey, Easton, Pa., and Paul S. Dickey, Cleveland, Ohio, assignors to Bailey Meter Company, a corporation of Delaware Application December 18, 1935, Serial No. 55,025
Renewed October 25, 1938

18 Claims. (Cl. 122—448)

The present invention relates to control systems and especially to a method and means useful in operating and controlling the operation of apparatus such as power producing and/or utilizing apparatus. More particularly it utilizes a variable in the operation of such apparatus as a measure of the operation and for the control of the same or other apparatus.

We have chosen as a preferred embodiment to illustrate and describe the present invention in connection with or related to the operation of vapor generators; particularly vapor generators of the drumless, forced flow type, having a fluid flow path including one or more long small-bore tubes, in which the flow in the path is initiated by the entrance of liquid under pressure at one end, and with the exit of vapor only at the other end; characterized by an inflow of liquid normally greater than the outflow of vapor, the difference being diverted from the path intermediate the ends thereof.

Such a vapor generator having small liquid storage and operated with wide range combustion devices forms a combination rendering practical extremely high heat release rates with the consequent ability to economically handle practically instantaneous load changes from minimum to maximum, and vice versa, without heavy standby expense, and is particularly suited for operating conditions such as locomotive service, where load variations are of a wide range and are required to be met substantially instantaneously.

The generator has a minimum liquid storage capacity with a maximum heat absorbing surface so disposed and arranged as to be substantially instantaneously responsive to rapid changes and wide diversities in heat release rate in the furnace. The heat absorbing surface is arranged in relation to the path of the products of combustion and radiant heating so that the entering liquid is received at the cooler end of the path. Further, the vapor generator insofar as the passage of combustion gases is concerned has a continuously increasing resistance to gas flow throughout the length of the passage.

The heat absorbing surface, or flow path for the working medium, is comprised of one or more long small-bore tubes with an enlargement, preferably at the end of the generator section, which acts as a separator to divide liquid and vapor. The vapor is then passed through a superheater, while the excess liquid carried through the tubes for the purpose of wetness and preventing scale deposit, is diverted out of the separator under regulated conditions, as will be hereinafter set forth. From the separator there is a normal continuous and an additional regulated spillover or diversion of a part of the liquid entering the economizer under pressure, so that there is always being fed to and through the economizer and vapor generating sections more liquid than can be converted into steam in a single passage therethrough, although the proportion of such excess liquid represents but a small part of the total volume of fluid passing through the vapor generator and is at most times only sufficient to insure tube wetness and to carry off scale forming material.

In vapor generators of the character mentioned having small liquid and heat storage with high heat release capabilities, the liquid inflow and heating must of necessity be continuous and at all times proportioned to the demand or output of the unit. Furthermore to accomplish the wide range in heat release with substantially instantaneous response and to perform the combustion process efficiently, a method and means for operating such a vapor generator in accordance with varying conditions must be provided.

A principal feature of the present invention lies in the utilization of a variable in the operation of the unit as a guide for the control of liquid supply and heating to the vapor generator.

We have chosen to illustrate and describe an arrangement wherein the level of liquid within the separator drum is utilized to control certain variables in the operation of the unit and where such control may desirably be sequential with level. It is to be understood, however, that the broad concept of our invention relates to sequential operation from any liquid level and to sequential operation in general.

Specific features and objects will become evident from a study of the specifications and of the drawings, wherein identical parts bear the same reference numerals, and in which:

Fig. 1 diagrammatically illustrates a drumless forced flow vapor generator, combined with the requisite apparatus to control the functioning thereof, and such apparatus shown in partially diagrammatic fashion.

Fig. 1A diagrammatically illustrates a forced flow vapor generator having a plurality of parallel flow paths.

Fig. 2 diagrammatically illustrates a drumless forced flow vapor generator, with a somewhat different arrangement of control apparatus than that of Fig. 1.

Fig. 3 is a sectional elevation of a pilot valve.

Figs. 4, 5 and 6 are pilot valves to an enlarged scale.

Figs. 7, 8 and 9 are graphs representing operation of the apparatus.

Fig. 10 is a detail of a part of the apparatus of Figs. 1 and 2, in modified form.

Figure 1A:
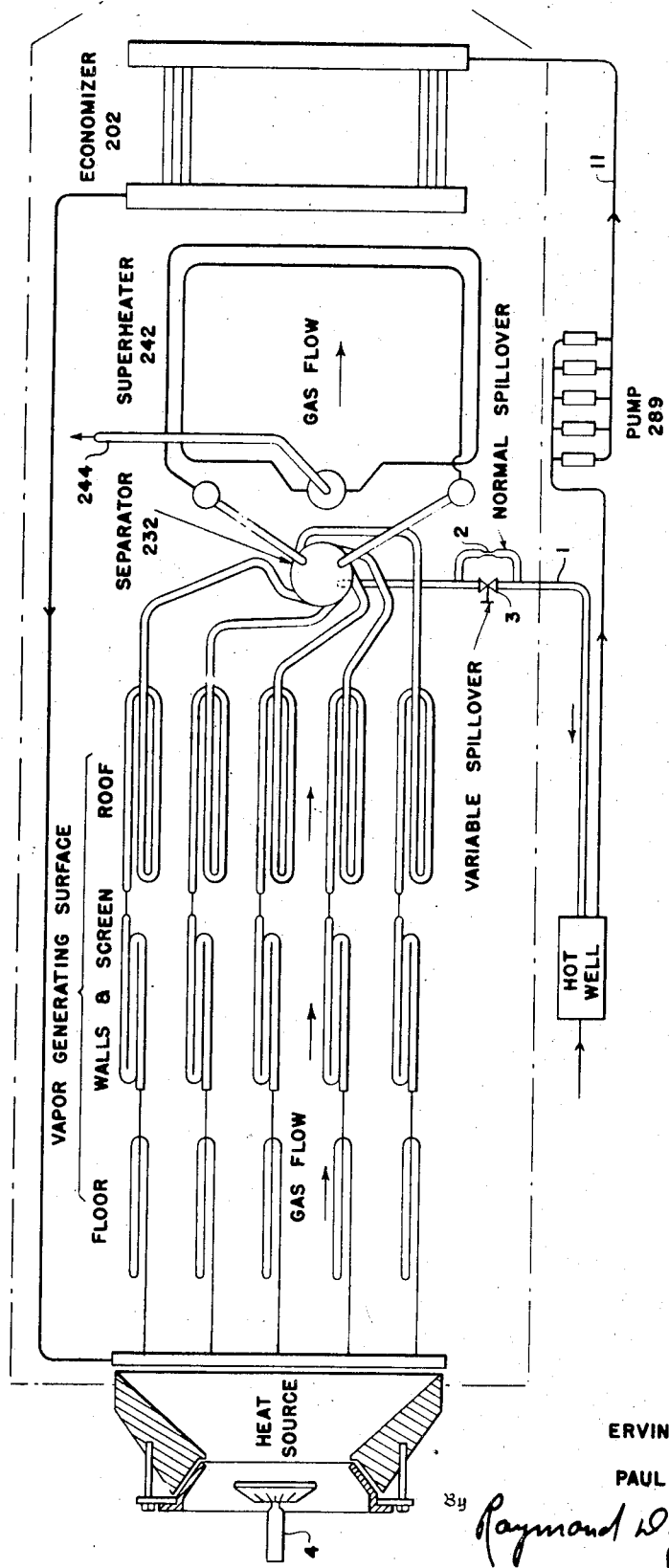

Referring now in particular to Fig. 1, we illustrate the fluid flow path as a single sinuous tube, to the economizer section 202 of which, liquid is supplied under pressure through a pipe 11 from a pump 289, which may be of any suitable type and which we have therefore illustrated merely diagrammatically. From the economizer section the fluid passes to and through the generating section discharging into the separator 232. From the separator, vapor passes to and through the superheater 242, leaving by the conduit 244 to a main turbine 12 illustrative of a vapor consuming device. Products of combustion pass successively through the generating section, superheater, and economizer and may contact a part or all of the separator.

An auxiliary turbine 287 drives the liquid feed pump 289, the air blower 288, and the fuel supply pump 290. While we have illustrated these devices diagrammatically and as though all are located to be driven by the same shaft and at the same speed, it will be understood that the necessary gear reduction, or driving connections between the several devices, are known and would be properly designed as to relative speed, power, etc., and that we merely intend to indicate that the auxiliary turbine 287 drives the devices 288, 289 and 290 simultaneously and in unison.

Excess liquid is diverted from the fluid flow path through a pipe 1 to the hot well or to waste. A normal continuous spillover occurs through the restriction 2 while a variable spillover occurs through a regulating valve 3.

The furnace of the vapor generator includes an oil burner 4 supplied by a pipe 5, and an air chamber 6 supplied by a conduit 7. In order to provide for initial ignition of the oil-firing means, a gas-firing device 8 is supplied by a pipe 9 with a flow of gas under the control of a solenoid actuated valve 10.

The rate of supply of fuel oil to the burner 4 is primarily controlled by the speed of the oil pump 290, but the supply of oil is further regulated by the throttling of a regulating valve 13 located in the pipe 5; and the rate of flow is continuously measured by a meter 14.

The rate of supply of air to support combustion is primarily determined by the speed of the blower 288, but is further under the control of a damper 15 positioned in the conduit 7 between the blower and the air chamber 6. The rate of supply of air is continuously measured by a flow meter 16.

The rate of supply of liquid under pressure through the conduit 11 is controlled by the speed of the pump 289 in turn under the control of variables in the operation of the system.

In Fig. 1A we diagrammatically illustrate a a forced flow vapor generator similar to that illustrated in Fig. 1 but having a plurality of parallel flow paths comprising tubes of great length and small bore.

In the operation of such a vapor generator certain variables are measured, indicated, and utilized as a basis for automatically controlling the supply of liquid thereto and the supply of the elements of combustion to the heating furnace.

We indicate at 17 a pressure responsive device such as a Bourdon tube connected to the conduit 244 and having an indicator pointer 18 adapted to cooperate with an index 19 for advising the instantaneous value of the vapor outflow pressure.

As an indicator of output, or load upon the vapor generator, we provide a Bourdon tube 20 adapted to position an indicator pointer 21 relative to an index 22. The Bourdon tube 20 is connected by means of a pipe with the turbine 12 at a location such that the Bourdon tube will be sensitive to first stage shell pressure of the turbine, which pressure bears a substantially straight line relation to rate of steam flow. Thus the pointer 21 will indicate, relative to the scale 22, a reading representative of rate of flow of steam from the vapor generator and thereby an indication of output or load upon the generator.

23 represents means responsive to liquid level within the separator 232 and constitutes a pressure casing enclosing a mercury U-tube connected across the vertical elevation of the separator. A float is adapted to rise and fall with the surface of the mercury in one leg and to thus cause a positioning of a pointer 24 relative to an index 25 to advise the instantaneous value of liquid level within the separator.

The flow meters 14 and 16 cooperate to position the stem of a pilot valve 26 from predetermined position, should the relation between air flow and fuel flow depart from that desired. The pilot 26 is adapted to control the positioning of the fuel supply valve 13.

The Bourdon tubes 17 and 20 each position the stem of a pilot valve for establishing an air loading pressure within the relay mechanism 27 from which a resultant air loading pressure is applied upon the diaphragm loading means 28.

We preferably primarily control the supply of liquid to the fluid flow path and the elements of combustion to the furnace, through variation in speed of the auxiliary turbine, utilizing the vapor outflow pressure and the turbine shell pressure as a basis for such control. Realizing, however, the possible difference in characteristics of the pumps and blower, as well as variations in conditions of operation, we provide readjusting means to supplement the primary control of the elements of combustion. For the air, such readjusting means comprises the damper 15 positioned at the outlet of the blower 288 by a pneumatic actuator 29. For the fuel, the readjusting means comprises the regulating valve 13 positioned in the pipe 5 responsive to departure from desired relation of the measure of fuel flow and the measure of air flow.

It is primarily desirable to vary the speed of the auxiliary turbine in step with the main turbine so as to roughly proportion liquid and the elements of combustion to the vapor generator according to load thereon; then to individually readjust the supply of fuel and air according to other variables in the operation of the system.

To determine the speed of the auxiliary turbine we preferably provide a pump, compressor or similar device 30 driven by and with the auxiliary turbine to establish a fluid pressure (such as an oil pressure) bearing a known relation to speed. We then utilize this oil pressure in a governing mechanism normally tending to hold the speed of the auxiliary turbine constant regardless of pressure of vapor supplied it. We then load up the oil pressure responsive device according to variations in vapor generator and main turbine operation, thus furnishing the speed requirements that the variable speed governor of the auxiliary turbine must work to.

Oil from the pump 30 passes through a pipe 31 (having a return connection 32) to an expansible metallic bellows 33, adapted to position one end of a floating link 34. The other end of the link 34 is moved by and with a power piston traveling in a cylinder 35 and adapted to move the vapor admission valves of the auxiliary turbine. A pilot stem 36 is suspended from the link 34 intermediate the ends thereof and controls the flow of oil under pressure through a pilot casing 37 to the opposite sides of the piston 35. A normally open regulable valve 38 is positioned between the pressure pipe 31 and the return pipe 32 to provide a by-pass around the pump 30. A fixed resistance 38' is in line 32.

The pilot valves indicated as at 26 and 37 are shown in detail in Fig. 3 and form the subject matter of the patent to Clarence Johnson, No. 2,054,464 granted September 15, 1936.

Fluid under pressure is supplied to the interior of the casing 37 intermediate the pilot lands 39, which lands are so spaced along the stem 36 as to coincide with narrow annular ports 40. When the pilot stem is axially moved in the casing so that the lands 39 are moved relative to the ports 40, then a definite loading pressure is available in the annular ports bearing a known relation to the amount of such movement. For example, if the stem 36 is moved upwardly there is available at the upper right-hand exit of the casing (Fig. 3) a loading pressure increasing in definite relation to said movement, while if the stem 36 is moved downwardly there is available at the lower right-hand exit a pressure increasing definitely with such movement.

Certain features relating to the turbine governor control herein disclosed but not claimed form the subject matter of Patents 2,170,348 and 2,163,592 to Paul S. Dickey.

The level responsive device 23 (Fig. 1) is adapted to position a pilot stem 41 for emergency and sequential control of variables in the operation of the system. It will be observed that both the upper and lower right-hand exists of the pilot casing are in use; the upper exit being connected to an emergency fuel shutoff valve 42 in the pipe 5, and the lower exit being connected to the regulated spillover valve 3, the air actuator 29, and the by-pass valve 38.

Referring now to Fig. 8 we illustrate therein, by means of a graph, the operation under the control of the device 23 responsive to level within the separator drum 232. The spillover connection 1 may coincide on level with the bottom of the separator or may be slightly above it. It is not desirable to have the water level unseal the spillover connection, and therefore we indicate as a lower safety limit a level slightly above the spillover connection. From this zone upwardly to an upper safety limit is the zone of control and this is divided roughly into a zone of air throttling and a zone of increased spillover.

The design of the pilot 41 as well as the various air actuators 3, 29, 38, 42 is such that the air pressure established at the two exits of the pilot valve cause the actuation or positioning of the various actuators in desired manner and sequence. If level within the separator drum is at approximately mid-point, then conditions are as desired. The damper 15 will be at its wide open position and very little if any excess diversion or spillover is passing through the valve 3. If, however, due to operating conditions the level within the separator begins to rise, then throughout the indicated range on Fig. 8 there is an additional spillover or diversion through the valve 3 as such valve is opened progressively with rise in level. That is, as the level in the separator rises, the pilot 41 is lowered and the air pressure effective upon the valve 3 is increased proportional to the axial movement of the pilot 41. Should the level continue to rise despite the increase in the amount of spillover and eventually reach the upper safety limit, then when this point is reached the increased air pressure effective upon the by-pass valve 38 will begin to overcome its loading spring and close the by-pass valve, building up the pressure within 33, to the end that the speed of the auxiliary turbine will be reduced and if the level continues to rise it may in fact stop the auxiliary turbine.

Throughout the zone of increased spillover the damper 15 is left at its widest open position. Should level within the separator fall from approximately the mid-position or an otherwise predetermined position, then through the zone marked "zone of air throttling" the damper 15 will be throttled toward a minimum opening position and inasmuch as the amount of air flow acts through the fuel flow-air flow ratio meters to control the fuel flow valve 13, this at the same time will control the fuel supply. Thus if for some operating reason the level within the separator decreases below the normal desired value, the supply of fuel and air to the furnace is progressively decreased until a balance is reached and the liquid level returns or tends to return to the desired level.

Should the level continue to drop to the lower safety limit, this action brings into play the uppermost land of the pilot 41 to vary the air loading pressure upon the valve 42 and if the lower safety limit is reached the valve 42 shuts off the fuel supply means and burner. Whenever the level is above this safety limit, however, the burner and fuel supply are normally available unless shut off from some other safety arrangement.

In Fig. 2 we illustrate the same general arrangement as that of Fig. 1 but with a modification insofar as the control from level within the separator 232 is concerned. A graph of operation is shown in Fig. 7 and differs mainly in that the upper portion of level is used as a zone of water pump by-pass rather than as a zone of increased spillover. The upper and lower safety limits may be provided and utilized in manner similar to that of Fig. 1.

The level device 23 is adapted to position the pilot stem 41 for establishing an air loading pressure from the upper right-hand exit of the pilot casing, varying substantially proportional to axial positioning of the pilot stem and therefore according to level within the separator. Such air loading pressure is effective upon the air actuator 29 for positioning the damper 15 and upon the air actuated valve 43 in a by-pass around the water pump 289, Fig. 2. When the level is at the desired elevation in the separator, the damper 15 is at its widest open position and the by-pass valve 43 is closed. Should the separator level increase above this point then the by-pass valve 43 begins to open and a portion of the water pumped will recirculate through the pump, thus decreasing the flow through conduit 11 but without varying the speed of the auxiliary turbine, and thus the rate of supply of fuel and air.

Should the level decrease below the desired value, then with the by-pass valve 43 closed the damper 15 would begin to be throttled and slightly reduce the firing without change in rate of supply of liquid to the system until the liquid level returns to the desired value.

Referring again to Fig. 1 wherein both exits from the pilot casing are used, it is possible to so vary the loading of the different air actuated devices controlled from said pilot that they will pick up in sequence or overlap. Graphs 7 and 8 indicate a substantially straight line control in direct sequence between the different zones of control. Reference to Fig. 9 will illustrate that the zone of air throttling for example may be with a control other than a straight line and that the zone of excess spillover or by-pass of the pump may be in curved relation of the same curvature or difference and that the two curves may overlap.

To illustrate such operation, attention is called to Figs. 4 and 5, which indicate different shapes of pilot lands wherein for example, the long gradual taper of Fig. 5 is of an entirely different sensitivity than the substantially spherical lands of Fig. 4. A different amount of axial movement of the pilot stem in one case is required for the same change in air loading pressure, and correspondingly the same axial movement results in a different change in air loading pressure, and thus the sensitivity is different the one from the other.

We may readily construct a pilot stem as in Fig. 6 having pilot lands of different sensitivity relative to the two exits, and furthermore these may be spaced along the pilot stem so that they will pick up and begin to change the air loading pressure at the different exits either to provide a straight sequential pick-up of the two curves end to end, as in Figs. 7 and 8, or a gap between the two wherein no variation is made in either the amount of spillover or the control of the air, or the curves may overlap and for a central portion of the level variation both spillover and air control be varied. Furthermore, the shape of the pilot lands, as well as the loading and shape of the springs at the valves and at the air actuator 29, may be such as to counteract damper characteristics or functional relation between level within the separator and air flow or damper position.

We indicate in Fig. 10 an arrangement of the level responsive device 23 wherein two pilot valves may be utilized and picked up over different ranges of travel of the arm 24. For example, if the level rises above a midpoint the arm 24 will engage the pilot stem of the uppermost pilot and begins to raise the same. If the level falls below the midpoint then the arm will begin to depress the pilot stem of the lowermost pilot. At a central level no movement of either of the pilot valves will occur.

While we have chosen to illustrate and describe certain preferred embodiments of the invention, and particularly in connection with the level within the separator drum of a vapor generator, it is to be understood that this is by way of illustration only and that we are not to be limited thereby except as to the claims in view of prior art.

What we claim as new, and desire to secure by Letters Patent of the United States, is:

1. The method of operating a vapor generator of the drumless forced flow type having a separator between the generating and superheating portions of the fluid flow path which includes, controlling the supply of air for combustion over certain ranges in level of liquid in the separator, and controlling level in the separator over other ranges in separator level.

2. The method of operating a vapor generator of the drumless forced flow type having a separator between the generating and superheating portions of the fluid flow path which includes, sequentially controlling variables in the operation of the vapor generator responsive to level of liquid within the separator.

3. The method of operating a vapor generator of the drumless forced flow type having a separator between the generating and superheating portions of the fluid flow path which includes, decreasing fuel supply when separator liquid level falls to a predetermined minimum value, controlling air supply for combustion responsive to predetermined level range, controlling level in the separator responsive to predetermined level range, and limiting the supply of liquid and of the elements of combustion to the vapor generator responsive to a predetermined maximum value.

4. The method of operating a vapor generator of the drumless forced flow type having a separator between the generating and superheating portions of the fluid flow path which includes, controlling the supply of air for combustion from liquid level in the separator when the division zone between liquid and vapor departs from predetermined location in one direction, and diverting liquid from the fluid flow path when the departure is in the other direction.

5. The combination with a vapor generator of the drumless forced flow type receiving liquid under pressure at one end and delivering superheated vapor at the other, a separator between the generating and superheating portions of the fluid flow path, and means responsive to liquid level within the separator for progressively controlling air for combustion and liquid level.

6. In combination, a vapor generator having a separating zone for vapor from liquid, means responsive to the location of and variation in said zone, and means controlled by said means and adapted when the zone moves in one direction to first regulate the air supplied for combustion to the vapor generator and as the zone continues to move in the same direction to then cease regulating the air and begin to regulate the liquid supply.

7. The combination with a vapor generator of the drumless forced flow type receiving liquid under pressure at one end and delivering superheated vapor at the other, a separator between the generating and super-heating portions of the fluid flow path, means responsive to liquid level within the separator, and means controlled thereby for first regulating air supply for combustion as level increases and subsequently diverting liquid from the fluid flow path as level continues to increase.

8. The combination with a vapor generator of the drumless forced flow type receiving liquid under pressure at one end and delivering superheated vapor at the other, a separator between the generating and superheating portions of the fluid flow path, air supply means for the generator, a liquid inflow pump for the fluid flow path and having a controllable by-pass, a meter of liquid level within the separator, and means under the control of said meter adapted to adjust said air supply means and said by-pass.

9. The combination with a vapor generator of the drumless forced flow type receiving liquid under pressure at one end and delivering superheated vapor at the other, a separator between the generating and superheating portions of the fluid flow path, air supply means for the generator, a liquid inflow pump for the fluid flow path and having a controllable by-pass, a meter of liquid level within the separator, and means under the control of said meter adapted to reduce air supply when liquid in the separator is below a predetermined level and to open the pump by-pass when liquid in the separator is above a predetermined level.

10. The method of operating a vapor generator of the drumless forced flow type having a separator between the generating and superheating portions of the fluid flow path which includes, utilizing the level of liquid within the separator to regulate one of the elements of combustion and to control the supply of liquid to the flow path through a variable by-passing of the fluid supply means.

11. The combination with a vapor generator of the drumless forced flow type receiving liquid under pressure at one end and delivering superheated vapor at the other, a separator between the generating and superheating portions of the fluid flow path, a liquid supply pump for the generator, means responsive to demand on the generator adapted to control pump speed, and means responsive to level within the separator adapted to variably by-pass the pump.

12. In combination with a vapor generator comprised of tubes of great length and small bore connected for flow of fluid from liquid inlet to vapor outlet and including a furnace and gas passage with an economizer and superheater in the latter, means for supplying liquid and elements of combustion continuously to the generator in synchronism with the rate of withdrawal of vapor for use and with an excess of liquid over vaporization throughout the vapor generating tubes, and means collecting up to a level and eliminating the excess liquid in advance of the superheater.

13. In combination with a vapor generator comprised of tubes of great length and small bore connected for flow of fluid from liquid inlet to vapor outlet and including a furnace and gas passage with an economizer and superheater in the latter, means for supplying liquid and elements of combustion continuously to the generator in synchronism with the rate of withdrawal of vapor for use and with an excess of liquid over vaporization throughout the vapor generating tubes, and means collecting up to a level and eliminating the excess liquid in advance of the superheater and adjusting the ratio of heat liberated to liquid fed from an indication of liquid level in the excess liquid collecting means.

14. In a high pressure, light weight and compact steam generator of low heat storage capacity inclusive of a furnace and superheater, a multiplicity of long small bore steam generating tubes, a steam and water separator with a spillover and located between the generating tubes and superheater, separate pumps, one delivering water to the generating tubes, another delivering fuel in suspension to the furnace and another delivering air with the fuel, means driving all of said pumps in fixed speed ratio to deliver enough water and release sufficient heat to evaporate less than all the water introduced while varying the speed in accordance with a measure of steam output from the generator, and means actuated from water level in the separator for maintaining spillover quantity or rate between maximum and minimum predetermined limits.

15. In steam generating apparatus, the combination of a generator through which water is circulated and partially converted into steam, means for delivering feed water to the generator, a heater for the generator, a separator for receiving the mixture of water and steam from the generator and separating the steam from the water, and means for increasing or decreasing the supply of fuel to the heater as the amount of water discharged from the separator increases or decreases.

16. In steam generating apparatus, the combination of a generator through which water is circulated and partially converted into steam, means for delivering feed water to the generator, a heater for the generator, a separator for receiving the mixture of water and steam from the generator and separating the steam from the water, and means for regulating the supply of an element of combustion to the heater as the amount of water discharged from the separator varies.

17. In steam generating apparatus, the combination of a generator through which water is circulated and partially converted into steam, means for delivering feed water to the generator, a heater for the generator, a separator for receiving the mixture of water and steam from the generator and separating the steam from the water, and means for regulating the supply of an element of combustion to the heater as the level of water in the separator varies.

18. In steam generating apparatus, the combination of a generator through which water is circulated and partially converted into steam, means for delivering feed water to the generator, a heater for the generator, a separator for receiving the mixture of water and steam from the generator and separating the steam from the water, and means for regulating the supply of fuel to the heater as the level of water in the separator varies.

ERVIN G. BAILEY.
PAUL S. DICKEY.